US012803693B2

(12) United States Patent
Liu et al.

(10) Patent No.: US 12,803,693 B2
(45) Date of Patent: Nov. 17, 2026

(54) SETTING A PRECISE TIME USING PRECISION TIME PROTOCOL CAPABLE NETWORK INTERFACE CARDS

(71) Applicant: Dell Products L.P., Round Rock, TX (US)

(72) Inventors: Yayun Liu, Austin, TX (US); Shree Rathinasamy, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 18/817,889

(22) Filed: Aug. 28, 2024

(65) Prior Publication Data

US 2026/0067016 A1 Mar. 5, 2026

(51) Int. Cl.
*H04J 3/06* (2006.01)
*G01S 19/01* (2010.01)

(52) U.S. Cl.
CPC ............ *H04J 3/0661* (2013.01); *G01S 19/01* (2013.01); *H04J 3/0644* (2013.01)

(58) Field of Classification Search
CPC ........ H04J 3/0661; H04J 3/0644; G01S 19/01
See application file for complete search history.

(56) References Cited

U.S. PATENT DOCUMENTS

2019/0357165 A1* 11/2019 Koelemeij ........ H04W 56/0065
2022/0322260 A1* 10/2022 Zhuge ........................ H03L 7/24
2024/0291580 A1* 8/2024 Ambeskar ............. H04J 3/0641

OTHER PUBLICATIONS

Abhishek, Raj, et al., "Using USB NIC to Manage OEM Appliances" Dell EMC, Aug. 2018 (11 pages).

* cited by examiner

*Primary Examiner* — Lakeram Jangbahadur
(74) *Attorney, Agent, or Firm* — Chamberlain, Hrdlicka, White, Williams & Aughtry; Aly Z. Dossa

(57) ABSTRACT

In general, certain embodiments described herein relate to a method for managing timing in a system. The method includes synchronizing a first TS of a global timekeeper with a global TS of a global positioning system (GPS) satellite. The method then transmits a first timestamp at a first point of time from the global timekeeper to a primary baseboard management controller (BMC). The primary BMC includes a second TS and the first timestamp is transmitted using precision time protocol (PTP). The primary BMC and the global timekeeper exchange three other timestamps which the primary BMC uses to calculate an offset time between the first TS and the second TS. The primary BMC then synchronizes the second TS with the first TS using the offset time.

20 Claims, 4 Drawing Sheets

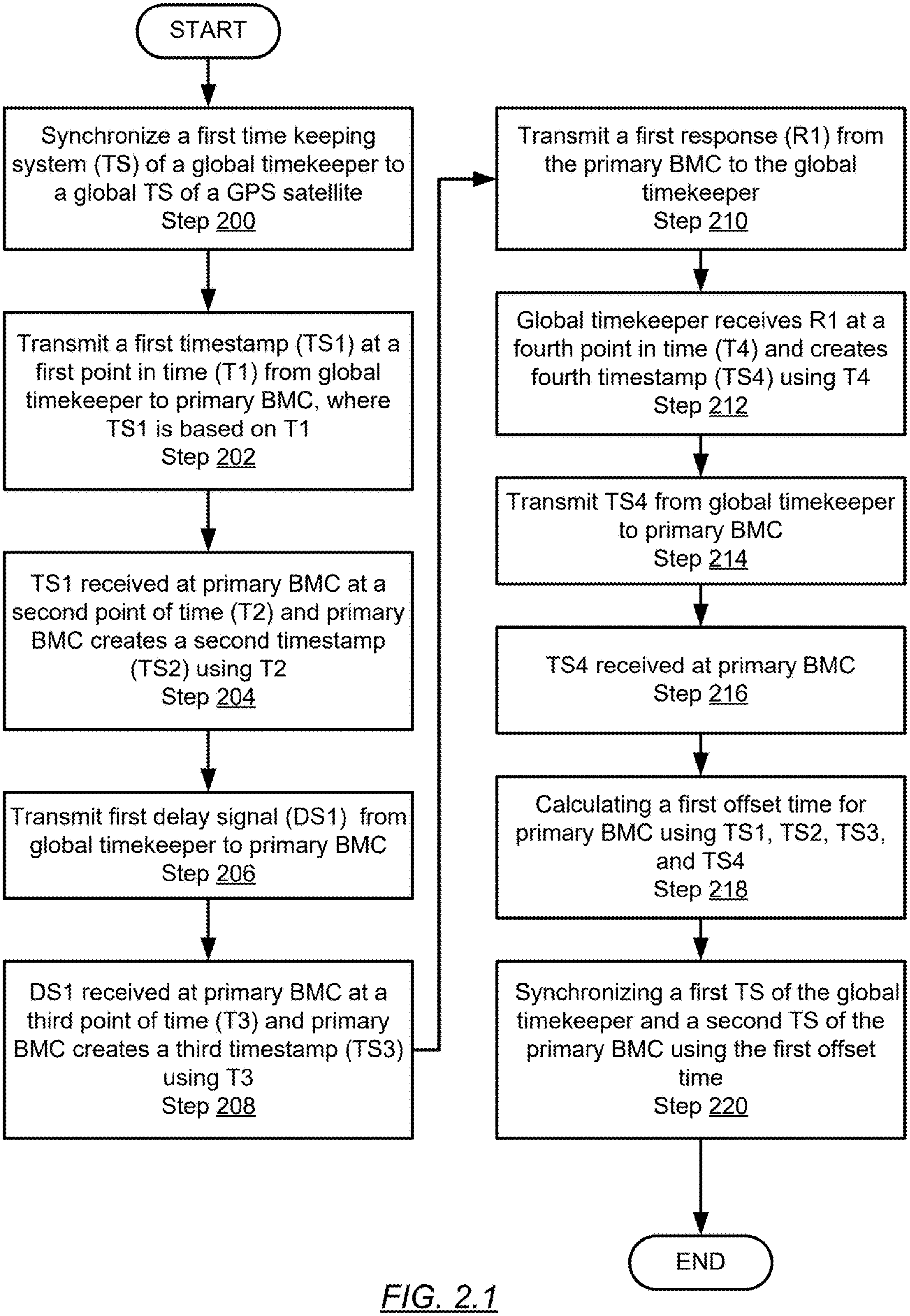
*FIG. 2.1*

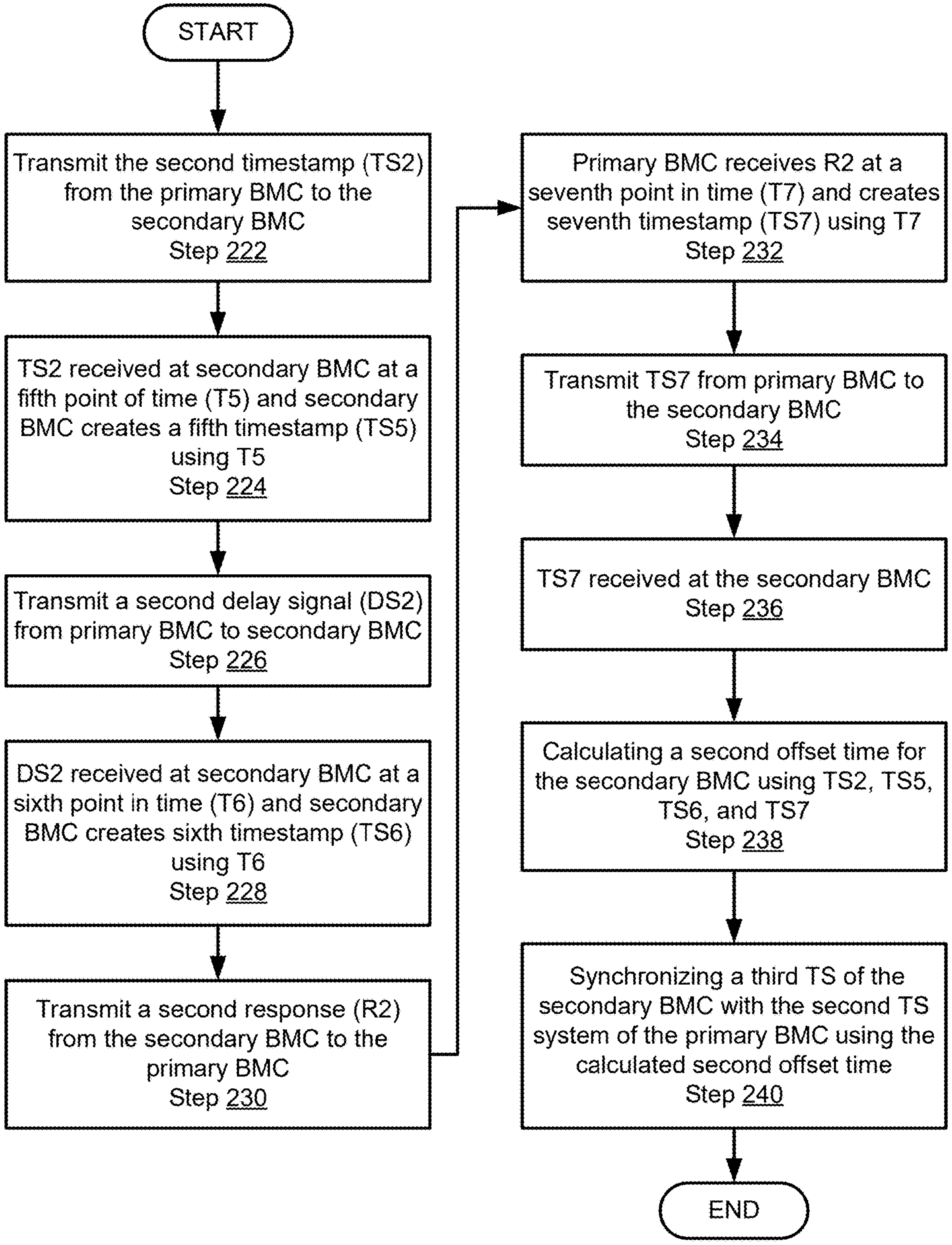
FIG. 2.2

SETTING A PRECISE TIME USING PRECISION TIME PROTOCOL CAPABLE NETWORK INTERFACE CARDS

BACKGROUND

Having precise time across computing systems is critical. During an initial boot, systems may set the time to the local time on the baseboard management controller (BMC) and then synchronize that time with the basic input/output system (BIOS). After the operating system (OS) loads, an administrator must reboot the system to allow the BMC and the BIOS to synchronize their times with the more accurate OS time. However, the OS time may itself not be accurate and, as such, the OS may attempt to obtain a more precise time from a remote time keeping system (TS). Obtaining a more precise time for a remote TS increases the complexity of the time synchronize process and, in many cases, requires the use of additional specialized hardware.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart of a method for managing timing in a system with a global timekeeper and a primary baseboard management controller (BMC) in accordance with one or more embodiments of the invention.

FIG. 2.2 shows a flowchart of a method for managing timing in a system with a primary baseboard management controller (BMC) and a secondary BMC in accordance with one or more embodiments of the invention.

DETAILED DESCRIPTION

In general, embodiments of the invention relate to a method and system for managing timing. In many traditional implementations, when a system is initially booted the system time is based on a local time of the baseboard controller in the system. The system time is then synchronized with the basic input/output system (BIOS) time. After the operating system (OS) is loaded, it obtains a more accurate time (also referred to as the OS time). The BIOS time and OS time are subsequently synchronized. After the synchronization, the system time is then resynchronized with the BIOS time on the next reboot the system.

One or more embodiments of the invention are directed to improving time synchronization processing in systems. More specifically, in various embodiments of the invention, the systems include a global timekeeper (which is a component that has its time synchronized with the time of a Global Positioning System (GPS) satellite. The primary BMC in the system is then synchronized with the global timekeeper. Secondary BMCs operatively connected to the primary BMC are then are able to be synchronized with the primary BMC. In this manner, only one system in a set of systems needs to include a global timekeeper and then that system can locally synchronize with other systems. This allows systems to obtain precise (or more precise) times (i.e., the system clocks include a more precise time) while not requiring each system to be able to connect with a GPS satellite.

More specifically, embodiments of the invention include using precision time protocol (PTP) to synchronize a time keeping system (TS) of the global timekeeper with a TS of the primary BMC and the TS of the primary BMC with TSs of the secondary BMCs. PTP is a defined protocol to precisely synchronize timing systems over a local area network (LAN). Embodiments of the invention allow the operation of the PTP to be extended to Virtual LANs. (VLANs).

In one or more embodiments, the primary BMC is located on the same physical system as the global timekeeper and the primary BMC synchronizes its time with the time of the global timekeeper by exchanging PTP messages via a baseboard management controller to operating system (BMC-OS) interface. The BMC-OS interface can be physical or virtual. After the primary BMC has been synchronized with the global timekeeper, the local time of one or more secondary BMCs is synchronized to the local time of the primary BMC operating within the same VLAN. The primary BMC acts as a transparent clock on the single system with the global timekeeper. By acting as a transparent clock, the primary BMC is able to synchronize the time of secondary BMCs on second systems in the same VLAN to it time by exchanging PTP messages.

The following describes one or more embodiments.

Figure 1:
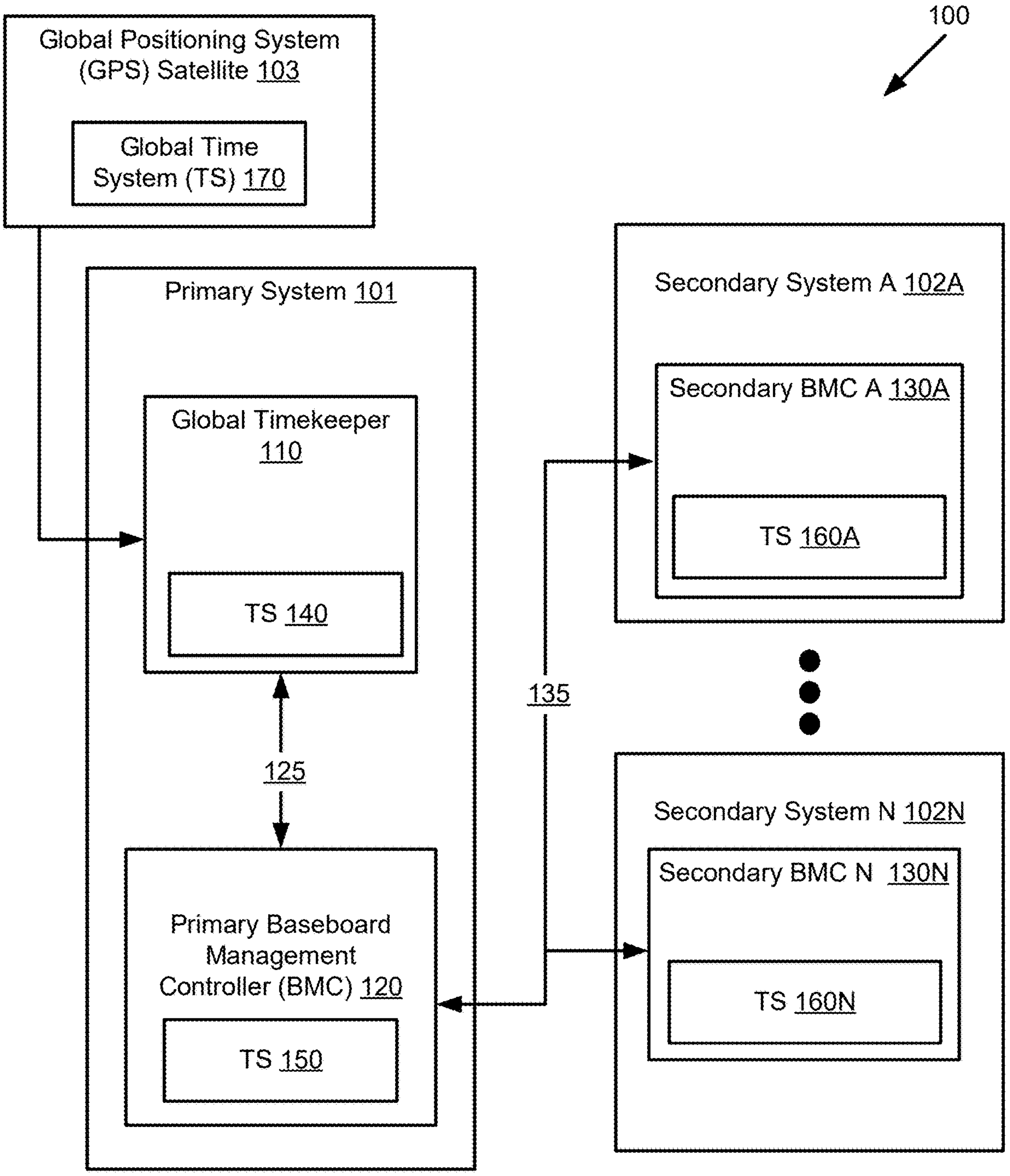
FIG. 1 shows a system in accordance with one or more embodiments of the invention.

FIG. 1 shows a system (100) in accordance with one or more embodiments of the invention. The system (100) may include a primary system (101), any number of secondary systems (102A-102N), and a global positioning system (GPS) satellite (103). Each component may be operatively connected to any of the other components via any combination of wired and/or wireless connections. Each component illustrated in FIG. 1 is discussed below. The system may include additional, fewer, and/or different components without departing from the invention. For example, in some embodiments the system (100) includes the primary system (101) and the GPS satellite (103) and not any secondary systems.

Figure 3:
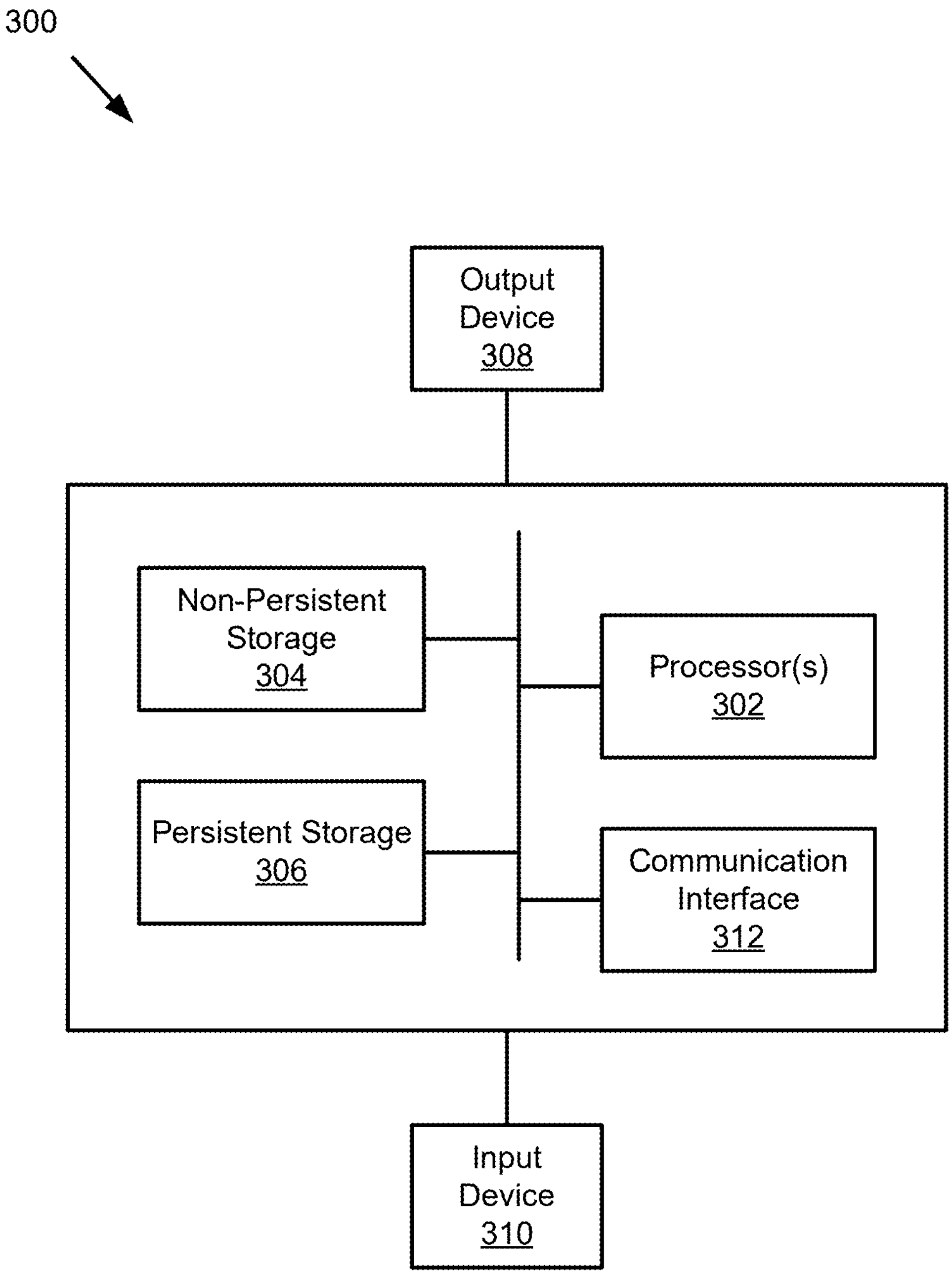
FIG. 3 shows a diagram of a computing device in accordance with one or more embodiments of the invention.

In one or more embodiments of the invention, the primary system (101) may be implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.).

The primary system (101) includes a global timekeeper (110) and a primary baseboard management controller (BMC) (120). In some embodiments, the global timekeeper (110) and the primary BMC (120) are operatively connected by a BMC-OS interface (125) such as, but not limited to, a universal serial bus (USB), network interface controller (NIC), or a local area network on motherboard (LOM) connection. The BMC-OS interface (125) can be physical or virtual. The connection between the global timekeeper and the primary BMC allows timestamps and synchronization messages to be encapsulated within Ethernet packets to be sent between the global timekeeper (110) and the primary BMC (120). The global timekeeper (110) is also operatively connected to the GPS satellite (103), which is described below. The primary system (101) may include additional, fewer, and/or different components without departing from the invention. Each component of the primary system (101) illustrated in FIG. 1 is discussed below.

The global timekeeper (110) is equipped with network adapters (e.g., PTP-enabled hardware) that allow for precision time protocol (PTP) grade timestamps to be transmitted and received. These PTP grade timestamps have sub-microsecond accuracy. The global timekeeper (110) implements a precision time protocol (PTP) daemon that manages PTP messaging. The global timekeeper (110) includes a first TS (140), which may be implemented as clock. The first TS (140) tracks the time in the global timekeeper (110). The global timekeeper (110) includes functionality to perform all, or a portion thereof, of the methods illustrated in FIGS. 2.1-2.2.

The primary BMC (120) is a service processor that may be used to manage the primary system (101). The primary BMC (120) may include a second TS (150). The second TS (150), which may be implemented as clock, which, in accordance with FIG. 2.1, is synchronized with the first TS (140). The primary BMC (120) executes a software-based PTP daemon to facilitate PTP operations including transmitting and receiving timestamps but does not need PTP-enabled hardware (which is included in the global timekeeper) due to the connection with the global timekeeper (110). The primary BMC) (120) includes functionality to perform all, or a portion thereof, of the methods illustrated in FIGS. 2.1-2.2.

Turning to the secondary system(s) (102A-102N) shown in FIG. 1, the system (100) may include any secondary system (102A-102N) (e.g., secondary system A (102A), secondary system N (102N)). The secondary systems (102A-102N) are described below with reference to the secondary system A (102A), but the description describes all secondary systems including secondary system N (102N). The secondary system A (102A) includes a secondary BMC A (130A), which executes a PTP daemon that allows for the transmitting and receiving of precise timestamps between the secondary BMC A (130A) and the primary BMC (120). The secondary BMC A (130A) does not require PTP-enabled hardware due to the connection to the primary BMC (120). The secondary BMC A (130A) is a service processor that may be used to manage the secondary system (e.g., 102A). The secondary BMC (e.g., 130A) includes a third TS (160A), which may be implemented as clock. The third TS (160A), in accordance with FIG. 2.2, synchronizes its time with the time of primary BMC (120). The secondary system N (102N) includes a secondary BMC N (130N) including a third TS (160N). The secondary system A (102A) and the secondary system N (102N) each execute an operating system (OS) and they may have different OSs.

The primary BMC (120) is operatively connected to the secondary BMC A (130A) in the VLAN via a connector (135), such as a private network path. The secondary BMC A (130A) acts as PTP ordinary clock.

In one or more embodiments of the invention, the secondary systems (102A, 102N) may be implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.).

The GPS satellite (103) is operatively connected to the global timekeeper (110). In some embodiments, the connection is a satellite connection. The GPS satellite (103) acts as a time reference for the global timekeeper (110). The GPS satellite (103) includes a global TS (170). The GPS satellite (103) transmits timestamps from the global TS (170) to the global timekeeper (110). The first TS (140) is synchronized with the global TS (170). PTP hardware built into the global timekeeper (110) allows for precise nanosecond time resolution between the first TS (140) and the global TS (170).

FIG. 2.1 shows a flowchart of a method for managing timing in a system with a global timekeeper and a primary baseboard management controller (BMC), in accordance with one or more embodiments of the invention. The method of FIG. 2.1 may be performed by, for example, the global timekeeper (e.g., 110, FIG. 1) and primary BMC (e.g., 120, FIG. 1). Other components of the system of FIG. 1 may perform all, or a portion, of the method of FIG. 2.1 without departing from the invention. For example, parts of the method can be performed by the global timekeeper (110, FIG. 1) and part of the method can be performed by the primary BMC (120).

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 2.1 may be performed in parallel with any other steps shown in FIGS. 2.1-2.2 without departing from the scope of the invention.

Turning to FIG. 2.1, in step 200, a first TS is synchronized with a global TS of a GPS satellite. The GPS satellite transmits a reference timestamp from the global TS to the global timekeeper. The global timekeeper then synchronizes the first TS with the global TS. In some embodiments, the GPS satellite is the GPS satellite (e.g., 103, FIG. 1) described in FIG. 1 and the global timekeeper is the global timekeeper (e.g., 110, FIG. 1) described in FIG. 1.

In step 202, a first timestamp (TS1) is transmitted from the global timekeeper to the primary BMC at a first point in time (T1) using PTP. The global timekeeper records the TS1 based on the T1, where TS1 is generated by the first TS of the global timekeeper using the clock in the first TS. The global timekeeper transmits a message to the primary BMC at the T1. The message includes the TS1, which is a timestamp of the T1. The TS1 travels through a BMC-OS connection in the primary system (e.g., 101, FIG. 1). In some embodiments, the primary BMC is the primary BMC described in FIG. 1.

In step 204, the TS1 is received at the primary BMC at a second point of time (T2). The primary BMC creates a second timestamp (TS2) based on the T2, where TS2 is generated by the second TS using the clock in the second TS (e.g., 150, FIG. 1). The primary BMC stores both TS2 and TS1.

In step 206, a first delay signal (DS1) is transmitted from the global timekeeper to the primary BMC using PTP. The DS1 travels through the BMC-OS. The DS1 includes the TS1 again to identify the DS1 as a delay signal.

In step 208, the DS1 is received at primary BMC at a third point in time (T3). The primary BMC records the T3 as a third timestamp (TS3), where TS3 is generated by the second TS using the clock in the second TS. The TS3 is stored in the primary BMC.

In step 210, a first response (R1) is transmitted from the primary BMC to the global timekeeper using PTP. The R1 travels through the BMC-OS connection.

In step 212, the R1 is received at the global timekeeper at a fourth point in time (T4). The global timekeeper records the T4 as a fourth timestamp (TS4), where TS4 is generated by the first TS using the clock in the first TS.

In step 214, the TS4 is transmitted from the global timekeeper to the primary BMC using PTP. The TS4 travels through the BMC-OS connection inside the first system to the primary BMC.

In step 216, the TS4 is received at the primary BMC. The TS4 is stored in the primary BMC.

In step 218, a first offset time (OT1) is calculated using TS1, TS2, TS3, and TS4. The first offset time may be calculated using the following formula, subtracting two differences and dividing the resulting difference by two:

$$OT1 = \frac{(TS2 - TS1) - (TS4 - TS3)}{2}$$

The first offset time is a measurement of the difference between the first TS and the second TS. The first offset time is used to address the network latency between the primary BMC and the global timekeeper. Because the first TS is synchronized with the global TS and the second TS is based on the local time of the primary BMC, the first offset time can be used to synchronize the second TS with the first TS.

In step 220, the first TS is synchronized with the second TS using the first offset time. Once the primary BMC receives the TS4 and calculates the first offset time, the primary BMC adds the first offset time to the TS4 to calculate the current time in the first TS. The primary BMC then resets the time in the second TS to the current time in the first TS, which results in synchronization of the second TS with the first TS.

FIG. 2.2 shows a flowchart of a method for managing timing in a system with the primary BMC and at least one secondary BMC, in accordance with one or more embodiments of the invention. The method of FIG. 2.2 may be performed by, for example, the primary BMC (e.g., 120, FIG. 1) and the secondary BMC (e.g., 130A, FIG. 1). Other components of the system of FIG. 1 may perform all, or a portion, of the method of FIG. 2.2 without departing from the invention. For example, parts of the method can be performed by the primary BMC (120, FIG. 1) and parts of the method can be performed by the secondary BMC A (130A, FIG. 1).

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 2.2 may be performed in parallel with any other steps shown in FIGS. 2.1-2.2 without departing from the scope of the invention.

In step 222, the TS2 is transmitted from the primary BMC to a secondary BMC using PTP. The TS2 travels through a VLAN connection from the primary BMC to the secondary BMC. For the purposes of this method, only a single secondary BMC will be recited; however, the method shown in FIG. 2.2. may be performed concurrently by multiple secondary BMCs, even if the secondary BMCs are part of secondary systems with different operating systems.

In step 224, the TS2 is received at the secondary BMC at a fifth point in time (T5). The secondary BMC records a fifth timestamp (TS5) based on the T5, where TS5 is generated by the third TS using the clock in the third TS. The secondary BMC stores both the TS5 and the TS2. In some embodiments, the TS5 is sent to the primary BMC for storage.

In step 226, a second delay signal (DS2) is transmitted from the primary BMC to the secondary BMC using PTP. The DS2 travels via the VLAN connection to the secondary BMC. The DS2 includes TS2 again to identify DS2 as a delay signal.

In step 228, the DS2 is received at the secondary BMC at a sixth point in time (T6). The secondary BMC records T6 as a sixth timestamp (TS6), where TS6 is generated by the third TS using the clock in the third TS. TS6 is stored in the secondary BMC. In some embodiments, TS6 is sent to the primary BMC for storage.

In step 230, a second response signal (R2) is transmitted from the secondary BMC to the primary BMC using PTP. The R2 travels through the VLAN connection to the primary BMC.

In step 232, the R2 is received at the primary BMC at a seventh point in time (T7). The primary BMC records T7 as a seventh timestamp (TS7), where TS7 is generated by the second TS using the clock in the second TS. In some embodiments, T7 corresponds to when the primary BMC receives TS4 from the global timekeeper as described in step 214 in FIG. 2.1.

In step 234, the TS7 is transmitted from the primary BMC to the secondary BMC using PTP. TS7 travels through the VLAN connection to the secondary BMC.

In step 236, TS7 is received by, and stored in, the secondary BMC.

In step 238, a second offset time is calculated using TS2, TS5, TS6, and TS7. The second offset time is calculated using the following formula, subtracting two differences and dividing the resulting difference by two:

$$OT2 = \frac{(TS5 - TS2) - (TS7 - TS6)}{2}$$

The second offset time is a measurement of the difference between the second TS (which is already synchronized with the first TS) and the third TS. The second offset time that addresses the network latency between the primary BMC and the secondary BMC. Because the second TS is synchronized with the first TS and the third TS is based on the local time of the secondary BMC, the second offset time can be used to synchronize the third TS with the second TS. In some embodiments, the second offset time is calculated by the secondary BMC. In other embodiments, the second offset time is calculated by the primary BMC and then sent to the secondary BMC for synchronization.

In step 240, the third TS is synchronized with the second TS using the second offset time. The primary BMC sends the current time in the second TS, which has been synchronized to the first TS, to the secondary BMC as an eighth timestamp (TS8). Once the secondary BMC receives the TS8 and calculates the second offset time, the secondary BMC adds the second offset time to the TS8 to calculate the current time in the second TS and the first TS. In embodiments where the primary BMC calculates the second offset time, the second offset time is sent to the secondary BMC with the TS8. The secondary BMC then resets the time in the third TS to the calculated time in the second TS, which synchronizes the third TS with the first TS and second TS.

In some embodiments, after synchronizing the second TS and the third TS with the first TS as shown in FIGS. 2.1 and 2.2, the process is repeated at a future time. The process is repeated to correct for any drift in the timing added to the second TS and the third TS over time.

As discussed above, embodiments of the invention may be implemented using computing devices. FIG. 3 shows a diagram of a computing device in accordance with one or more embodiments of the invention. The computing device (300) may include one or more computer processor(s) (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

The problems discussed above should be understood as being examples of problems solved by embodiments of the invention disclosed herein and the invention should not be limited only to solving the same/similar problems. The disclosed invention is broadly applicable to address a range of problems beyond those discussed herein.

Specific embodiments are described with reference to the accompanying figures. In the above description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the prior description of the figures, any component described with regard to a figure, in various embodiments of the invention, may be equivalent to one or more like-named components described with regard to any other figure. For brevity, descriptions of these components are not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connections between any number of devices or components connecting the operatively connected devices) connection. Thus, any path through which information may travel may be considered an operative connection.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing timing in a system, the method comprising:

synchronizing a first time keeping system (TS) of a global timekeeper with a global TS of a global positioning system (GPS) satellite;

transmitting a first timestamp at a first point of time from the global timekeeper to a primary baseboard management controller (BMC), wherein the primary BMC comprises a second TS and wherein the first timestamp is transmitted using precision time protocol (PTP);

receiving the first timestamp at a second point in time at the primary BMC, wherein the second point in time is recorded as a second timestamp;

transmitting a first delay signal from the global timekeeper to the primary BMC;

receiving the first delay signal at the primary BMC at a third point in time, wherein the third point in time is recorded as a third timestamp;

transmitting a first response signal from the primary BMC to the global timekeeper;

receiving the first response signal at the global timekeeper at a fourth point in time;

transmitting a fourth timestamp of the fourth point in time from the global timekeeper to the primary BMC;

receiving the fourth timestamp at the primary BMC;

calculating a first offset time between the global timekeeper and the primary BMC using the first timestamp, the second timestamp, the third timestamp, and the fourth timestamp; and synchronizing the first TS and the second TS using the first offset time.

2. The method of claim 1, further comprising:

transmitting the second timestamp of the second point in time from the primary BMC to a secondary BMC, the secondary BMC having a third TS;

transmitting a second delay signal from the primary BMC to the secondary BMC;

receiving the second timestamp at the secondary BMC at a fifth point in time, wherein the fifth point in time is recorded as a fifth timestamp;

receiving the second delay signal at the secondary BMC at a sixth point in time, wherein the sixth point in time is recorded as a sixth timestamp;

transmitting a second response signal from the secondary BMC to the primary BMC;

receiving the second response signal at the primary BMC at a seventh point in time, wherein the seventh point in time is recorded as a seventh timestamp;

transmitting the seventh timestamp to the secondary BMC from the primary BMC;

calculating a second offset time between the primary BMC and the secondary BMC using the second timestamp, the fifth timestamp, the sixth timestamp, and the seventh timestamp; and synchronizing the third TS using the first offset time and the second offset time.

3. The method of claim 1, wherein the first offset time is calculated by subtracting a difference of the second timestamp and the first timestamp from a difference of the fourth timestamp and the third timestamp and dividing a resulting difference by two.

4. The method of claim 2, wherein:

the first offset time is calculated by subtracting a difference of the second timestamp and the first timestamp from a difference of the fourth timestamp and the third timestamp and dividing a resulting difference by two; and the second offset time is calculated by subtracting a difference of the fifth timestamp and the second timestamp from a difference of the seventh timestamp and the sixth timestamp and dividing a resulting difference by two.

5. The method of claim 2, wherein the secondary BMC includes two or more secondary BMCs, the two or more secondary BMCs comprising separate third TSs that are synchronized with the first TS and the second TS.

6. The method of claim 5, wherein the two or more secondary BMCs each execute an operating system and one secondary BMC executes a different operating system to a different secondary BMC.

7. The method of claim 1, wherein the transmitting of the first timestamp, the second timestamp, the third timestamp, and the fourth timestamp uses precision time protocol.

8. A non-transitory computer readable medium comprising computer readable program code, which when executed by a computer processor enables the computer processor in a primary baseboard management controller to perform a method for managing timing in a system, the method comprising:

receiving a first timestamp at a second point in time at a primary BMC, wherein:

the first timestamp is transmitted from a global timekeeper at a first point in time, the first timestamp is transmitted using precision time protocol (PTP), the global timekeeper comprises a first TS synchronized with a global TS of a global positioning system (GPS) satellite, the primary BMC comprises a second TS, and the second point in time is recorded as a second timestamp, receiving a first delay signal at the primary BMC at a third point in time, wherein the third point in time is recorded as a third timestamp and the first delay signal is transmitted from the global timekeeper;

transmitting a first response signal from the primary BMC to the global timekeeper;

receiving a fourth timestamp at the primary BMC from the global timekeeper, wherein the fourth timestamp corresponds to a fourth point of time when the global timekeeper receives the first response signal;

calculating a first offset time between the global timekeeper and the primary BMC using the first timestamp, the second timestamp, the third timestamp, and the fourth timestamp; and synchronizing the first TS and the second TS using the first offset time.

9. The non-transitory computer readable medium of claim 8, the method further comprising:

transmitting the second timestamp of the second point in time from the primary BMC to a secondary BMC, the secondary BMC having a third TS, wherein the second timestamp is received at the secondary BMC at a fifth point in time, and the fifth point in time is recorded as a fifth timestamp;

transmitting a second delay signal from the primary BMC to the one secondary BMC, wherein the second delay signal is received at the secondary BMC at a sixth point in time and the sixth point in time is recorded as a sixth timestamp;

receiving a second response signal at the primary BMC at a seventh point in time, wherein:

the seventh point in time is recorded as a seventh timestamp, and the second response signal is transmitted from the secondary BMC, transmitting the seventh timestamp to the secondary BMC;

calculating a second offset time between the primary BMC and the secondary BMC using the second timestamp, the fifth timestamp, the sixth timestamp, and the seventh timestamp; and synchronizing the third TS using the first offset time and the second offset time.

10. The non-transitory computer readable medium of claim 8, wherein the first offset time is calculated by subtracting a difference of the second timestamp and the first timestamp from a difference of the fourth timestamp and the third timestamp and dividing a resulting difference by two.

11. The non-transitory computer readable medium of claim 9, wherein:

the first offset time is calculated by subtracting a difference of the second timestamp and the first timestamp from a difference of the fourth timestamp and the third timestamp and dividing a resulting difference by two; and the second offset time is calculated by subtracting a difference of the fifth timestamp and the second timestamp from a difference of the seventh timestamp and the sixth timestamp and dividing a resulting difference by two.

12. The non-transitory computer readable medium of claim 9, wherein the secondary BMC includes two or more secondary BMCs, the two or more secondary BMCs comprising separate third TSs that are synchronized with the first TS and the second TS.

13. The non-transitory computer readable medium of claim 12, wherein the two or more secondary BMCs each execute an operating system and one secondary BMC executes a different operating system to a different secondary BMC.

14. The non-transitory computer readable medium of claim 8, wherein the transmitting of the first timestamp, the second timestamp, the third timestamp, and the fourth timestamp uses precision time protocol.

15. A system for managing timing, the system comprising:

a global timekeeper; and a primary baseboard management controller (BMC) that communicates with the global timekeeper, wherein the global timekeeper is programmed to:

synchronize a first TS of the global timekeeper with a global TS of a global positioning system (GPS) satellite;

transmit, via precision time protocol (PTP), a first timestamp at a first point of time to the primary BMC;

transmit a first delay signal to the primary BMC;

receive a first response signal at a fourth point in time; and transmit a fourth timestamp of the fourth point in time to the primary BMC, wherein the primary BMC is programmed to:

receive the first timestamp at a second point in time, wherein the second point in time is recorded as a second timestamp and the primary BMC comprises a second TS;

receive the first delay signal at a third point in time, wherein the third point in time is recorded as a third timestamp;

transmit the first response signal to the global timekeeper;

receive the fourth timestamp at the primary BMC;

calculate a first offset time between the global timekeeper and the primary BMC using the first timestamp, the second timestamp, the third timestamp, and the fourth timestamp; and synchronize the first TS and the second TS using the first offset time.

16. The system of claim 15, further comprising:

a secondary BMC that communicates with the primary BMC, wherein the primary BMC is further programmed to:

transmit the second timestamp of the second point in time to the secondary BMC;

transmit a second delay signal to the secondary BMC;

receive a second response signal at a seventh point in time, wherein the seventh point in time is recorded as a seventh timestamp;

transmitting the seventh timestamp to the secondary BMC;

wherein the secondary BMC is programmed to:

receive the second timestamp at a fifth point in time, wherein the fifth point in time is recorded as a fifth timestamp and the secondary BMC comprises a third TS;

receive the second delay signal at the secondary BMC at a sixth point in time, wherein the sixth point in time is recorded as a sixth timestamp;

transmit a second response signal to the primary BMC;

calculate a second offset time between the primary BMC and the secondary BMC using the second timestamp, the fifth timestamp, the sixth timestamp, and the seventh timestamp; and synchronize the third TS using the first offset time and the second offset time.

17. The system of claim 15, wherein the first offset time is calculated by subtracting a difference of the second timestamp and the first timestamp from a difference of the fourth timestamp and the third timestamp and dividing a resulting difference by two.

18. The system of claim 16, wherein:

the first offset time is calculated by subtracting a difference of the second timestamp and the first timestamp from a difference of the fourth timestamp and the third timestamp and dividing a resulting difference by two; and the second offset time is calculated by subtracting a difference of the fifth timestamp and the second timestamp from a difference of the seventh timestamp and the sixth timestamp and dividing a resulting difference by two.

19. The system of claim 16, wherein the secondary BMC includes two or more secondary BMCs, the two or more secondary BMCs comprising separate third TSs that are synchronized with the first TS and the second TS.

20. The system of claim 19, wherein the two or more secondary BMCs each execute an operating system and one secondary BMC executes a different operating system to a different secondary BMC.

* * * * *